(12) United States Patent
Holte et al.

(10) Patent No.: US 12,024,454 B2
(45) Date of Patent: Jul. 2, 2024

(54) ADVANCED PHOSPHOROUS RECOVERY PROCESS AND PLANT

(71) Applicant: Cambi Technology AS, Asker (NO)

(72) Inventors: Hans Rasmus Holte, Reistad (NO); Davy P. M. Ringoot, Broekstraat (BE)

(73) Assignee: Cambi Technology AS, Asker (NO)

( * ) Notice: Subject to any disclaimer, the term of this patent is extended or adjusted under 35 U.S.C. 154(b) by 540 days.

(21) Appl. No.: 17/309,330

(22) PCT Filed: Nov. 21, 2019

(86) PCT No.: PCT/EP2019/082131
§ 371 (c)(1),
(2) Date: May 19, 2021

(87) PCT Pub. No.: WO2020/104610
PCT Pub. Date: May 28, 2020

(65) Prior Publication Data
US 2022/0017395 A1    Jan. 20, 2022

(30) Foreign Application Priority Data

Nov. 21, 2018 (EP) .................................. 18207649
Dec. 7, 2018 (EP) .................................. 18211017

(51) Int. Cl.
| | |
|---|---|
| *C02F 9/00* | (2023.01) |
| *C02F 1/20* | (2023.01) |
| *C02F 1/52* | (2023.01) |
| *C02F 11/04* | (2006.01) |
| *C02F 11/127* | (2019.01) |
| *C02F 11/18* | (2006.01) |

(Continued)

(52) U.S. Cl.
CPC .................. *C02F 9/00* (2013.01); *C02F 1/20* (2013.01); *C02F 2001/5218* (2013.01); *C02F 1/5236* (2013.01); *C02F 11/04* (2013.01); *C02F 11/127* (2013.01); *C02F 11/18* (2013.01); *C02F 2101/105* (2013.01); *C02F 2101/16* (2013.01); *C02F 2301/046* (2013.01)

(58) Field of Classification Search
CPC ...... C02F 11/04; C02F 2101/105; C02F 3/28; C02F 9/00; C02F 11/12; C02F 1/20; C02F 1/5236; C02F 11/127
USPC ......................................... 210/603, 613, 906
See application file for complete search history.

(56) References Cited

U.S. PATENT DOCUMENTS

| | | | |
|---|---|---|---|
| 5,141,646 A | 8/1992 | Rozich | |
| 2010/0170845 A1* | 7/2010 | Baur ..................... | C02F 1/5254 423/157.5 |

(Continued)

FOREIGN PATENT DOCUMENTS

EP           1496019 A1        1/2005

*Primary Examiner* — Claire A Norris
(74) *Attorney, Agent, or Firm* — Downs Rachlin Martin PLLC

(57) ABSTRACT

A method and plant for recovering phosphate from a biomass material, the biomass material suitably being a waste activated sludge from an upstream wastewater treatment process including a biological P removal process. The method includes an anaerobic digestion stage and steps for recovering independent streams rich in $PO_4$ and Mg, or rich in $PO_4$ and $NH_4$, thereby increasing the amount of P recovered and avoiding struvite formation in the anaerobic digester and accessory equipment thereof, such as pipes.

13 Claims, 2 Drawing Sheets

(51) Int. Cl.
*C02F 101/10* (2006.01)
*C02F 101/16* (2006.01)

(56) References Cited

U.S. PATENT DOCUMENTS

2013/0134089 A1  5/2013  Cote
2014/0251902 A1* 9/2014  Solheim ................ C02F 11/13
                                              210/178

* cited by examiner

ADVANCED PHOSPHOROUS RECOVERY PROCESS AND PLANT

FIELD OF THE INVENTION

The invention concerns a process and plant for the recovery of phosphorous (P) from wastewater in combination with a reduction of sludge volumes and enhanced biogas production from sludge. In particular, the invention concerns the additional removal and recovery of phosphorous from sludge produced in a wastewater treatment plant comprising conventional biological phosphorous removal processes. More particularly, the invention concerns the additional removal of P from the sludge produced in conventional biological phosphorous removal and recovering the P in compacted form as struvite ($MgNH_4PO_4 \cdot 6H_2O$), calcium phosphate ($CaPO_4$), vivianite ($Fe_3(PO_4)_2 \cdot 8H_2O$), magnesium phosphate ($MgPO_4$) or similar.

BACKGROUND OF THE INVENTION

In several European markets legal framework is being created to recover phosphorous (P) from wastewater treatment plants. Phosphorous is considered a limited resource and is mined in politically unstable markets. Europe has defined some key chemical elements that are considered strategic and P is one of them.

Normally, during wastewater treatment, P is concentrated into the wastewater sludge and therefore the recovery of P is focused on the sludge treatment line. P is removed from wastewater treatment either chemically via precipitation with Fe or Al, or biologically by so-called Bio-P processes i.e. Enhanced Biological P Removal (EBPR), When considering P-recovery from the sludge line, it is generally assumed that the Bio-P process is applied to the wastewater line.

The conventional Bio-P is based on the observation that some bacteria will accumulate an excess of poly-P in their cells when exposed to certain conditions. In order to select for bio-P process one needs to:
- expose the bacteria to anaerobic conditions (no $O_2$ or $NO_3/NO_2$) in the presence of volatile fatty acids (VFA), This leads to release of stored P (as ortho-P) and uptake of VFA, which are converted into PHA (Polyhydroxyalkanoic Acid). During anaerobic conditions, also Mg is released.
- expose the bacteria to aerobic conditions where PHA is consumed and $PO_4$—P (and Mg) is taken up and stored as poly-P inside the cell,
- in an EBPR plant the sludge is normally cycled through these anaerobic and aerobic cycles at ambient temperatures, which—depending on climate and season—can be from 5° C.-40° C., but in general are 10-20° C., resulting in the growth of the EBPR bacteria,
- when properly designed and managed, the net result is an uptake of P from the wastewater and a sludge with an accumulation of P inside the cell mass. Typical P content of the resulting biomass material is around 5% on dry weight, as compared to 1.5% for non-EBPR sludge.

A typical EBPR-process is depicted in FIG. 1,

A particular issue of concern in connection with sludge from the EBPR-process is struvite formation. Struvite is a crystal with chemical formula $MgNH_4PO_4 \cdot 6H_2O$. It is formed whenever its constituents ($PO_4^{3-}$, $NH_4^+$ and $Mg^{2+}$) are present in large enough concentrations and pH is high enough (>8). Struvite is often formed unwanted or uncontrolled in anaerobic digesters where the above three constituents are released from the sludge; this is especially the case for EBPR sludge and this can lead to massive problems, with digesters being filled with struvite, pipes and equipment being completely blocked, excessive wear and tear etc.

Anaerobic digestion of sludge is a common technology for the stabilization of sewage sludge such as EBPR sludge and for the production of renewable energy. During the anaerobic digestion stage, some of the P in the sludge is released, yet a substantial amount is precipitated together with Mg or Ca ions that are also released during digestion. The efficiency of P recovery from anaerobic digestion streams is therefore usually quite low and thereby EBPR sludge digestion usually suffers from scaling issues due to struvite ($MgNH_4PO_4$) formation inside not only the digesters but also in the surrounding piping and equipment.

US2014178281 discloses a method for removal and recovery of P from wastewater and producing inorganic P-complexes including digestate recycle, by recycling the final dewatering stream back to pre-thickening to mix phosphorous and nitrogen.

US2013196403 discloses a process and system for recovering P from wastewater, by recycling ammonia from a digestate back to a pre-thickening stream, yet by using an ammonia stripper.

DE102005002066 A1 discloses a method for obtaining phosphate salts such as struvite from stabilized sludge by: dewatering the stabilized sludge, extracting a sludge liquor containing phosphate by introducing ammonia and/or a hot process liquor into the dewatered stabilized sludge, and precipitation of phosphate salt from the sludge liquor containing phosphate by adding a compound containing metal ions.

DE 10 2015 203 484 discloses struvite formation whereby Mg is added in the form of an additive, and, thus, not by relying on the mixing of internal process streams.

US2010170845 discloses a process where waste activated sludge is stripped to remove internal P, whereby pre and post-dewatering liquids are combined to give the right mix, while P is released by fermenting primary sludge. This citation is silent about the use of thermal hydrolysis on the digested sludge. Also, the processes described rely on biological hydrolysis of a primary sludge based on the P-enriched biological sludge itself to provide a source of VFAs.

WO 2018036987 discloses a process for recovering P in a wastewater treatment plant with advanced sludge treatment, the process including i) biologically removing P from the effluent (wastewater), ii) separating water and sludge, iii) conducting a step of anaerobic hydrolysis of at least part of this sludge, iv) conducting a step of liquid/solid separation of the effluents from step iii), v) conducting advanced treatment of at least part of the sludge from iv), vi) recirculating to step iii of at least a part of the liquid effluent from step, and vii) recovering the P present in the effluent from step iv). The process may also include an anaerobic digestion step between steps iv) and v). This citation is silent about the provision of a dewatering stage after the anaerobic digestion stage for producing a separate liquid concentrate stream which is used in a phosphorous removal stage, and is also silent about the recycling of liquid concentrate from a thermal hydrolysis stage to the anaerobic stage.

It is also known from US2009194476 to remove P from wastewater according to a process that uses primary sludge as a source of VFA through fermentation of the primary sludge. This process is at least silent about applying thermal hydrolysis to a digested sludge and is not able to achieve any benefits in terms of increased biogas formation or improved dewatering, and not least it can only recover the P that is released as a result of biological processes.

US20140251902A1 describes a method involving applying thermal hydrolysis to digested sludge, followed by dewatering of the hydrolysed sludge into a cake product and a concentrate, of which the concentrate is returned to the digester. Nothing is mentioned about the use of the concentrate for other purposes than for returning it to the digester, and the document does not deal with questions concerning the release or recovery of P from sludge.

U.S. Pat. No. 5,141,646A like a number of other prior art documents describe processes for aerobic stabilisation of sewage sludge followed by hydrolysis. As soluble P would be expected to be accumulated during aerobic treatment of EBPR-sludge such processes would as a starting point not per se be relevant in the context of solving the problem relevant to the present invention, i.e. to promote the total P release to an extraordinary high level. Also, e.g. U.S. Pat. No. 5,141,646A is silent about the possible production of any VFA's from the hydrolysis or the possible release of P during the hydrolysis, just like it is silent about the possible use of the hydrolysed sludge for any Bio-P purposes.

In conclusion, the prior art primarily focuses on the release of P from the EBPR sludge with the goal of minimizing struvite precipitation problems in downstream equipment. The prior art, however, is not focused on maximization of P-recovery from the sludge involved, e.g. in the context of meeting certain minimum efficiency standards (e.g, at least 50% recovery and/or <2% P in the sludge, as required by German legislation). Also according to a recent review (Phosphorus recovery from municipal wastewater: An integrated comparative technological, environmental and economic assessment of P recovery technologies, L. Egle, et al. Institute for Water Quality, Resource and Waste Management, TU Wien, Karlsplatz 13/226, 1040 Vienna, Austria, The Centre for Water Resource Systems (CWRS) at TU Wien, Karlsplatz 13/222, 1040 Vienna, Austria) sets out that "For technologies recovering P from the digester supernatant, considerable recovery rates of 10 to a maximum of 25%, with the exception of the DHV Crystalactor® with recovery rates of up to 40%, are only achievable in WWTPs with enhanced biological phosphorus removal". In other words the prior art processes available have only been capable of removing up to 40% of the P present in the relevant sludge or biomass, whereas the methods and plants according to the present invention enables removal of at least 50% of the P present in the relevant sludge or biomass.

SUMMARY OF THE INVENTION

It is therefore an object of the present invention to provide a process and plant that enable extracting at least 50% of the P load from the sludge and recovering it in a contracted form, such as struvite, $CaPO_4$, $MgPO_4$ or similar.

It is another object of the present invention to provide a process and plant that enable extracting at least 50% of the P load from the sludge without making use of the addition of extraneous chemicals, e.g. in the form of different ammonia and metal ion sources.

It is another object of the present invention to provide a process and plant that enable maximizing the conversion of organics into biogas (renewable energy).

It is yet another object of the present invention to provide a process and plant that enable optimizing the sludge dewatering performance and limiting the amount of sludge cake that needs to be disposed of.

It is yet another object of the present invention to provide a process and plant that produces a stabilized, hygienised and concentrated biofertilizer (dewatered sludge) with low P content. In the agricultural application of sludge upper regulatory limits to the amount of P is normally the limiting step.

It is yet another object of the present invention to provide a process and plant that are simple and easy to integrate into existing wastewater treatment plants comprising biological P removal.

In order to achieve the above-mentioned objects, the present invention combines elements from several different fields of expertise:

"Water line" vs "Sludge line": in wastewater treatment science it is common for engineers and scientist to be specialised either in the water line or in the sludge line. The specialisation is a result of the different science and technology that is normally applied in the two distinct treatment lines.

"Biological" vs "thermochemical": Biological wastewater treatment and especially Bio-P processes (as applied in the production of EBPR sludge) require a detailed understanding of microbiology and chemistry. In contrast sludge treatment and especially advanced treatment applying Thermal Hydrolysis requires a detailed understanding of thermodynamics and thermochemistry.

The present invention, thus, represents a unique combination of elements and insights from several different technical fields and several fields of expertise (microbiology, chemistry, thermochemistry, thermodynamics, etc.).

It is this unique combination of elements and insights that enables a targeted recovery of >50% of the P load from the sludge, which has not been possible with any of the prior art technologies mentioned above.

DETAILED DESCRIPTION OF THE INVENTION

The above-mentioned objects and other objects are solved by the present invention in the following manner.

Accordingly, in a first aspect of the invention, there is provided a method for recovering at least 50% of the phosphate load from a biomass material, said method comprising the steps of:
(a) contacting in a contact tank said biomass material together with a, preferably hot, liquid concentrate stream (g2) from step (g), for producing a mixed sludge,
(b) separating in a thickener unit the mixed sludge of step (a) into: a concentrated thickened sludge product (b1) with reduced P and Mg levels, and a liquid concentrate (b2) rich in P and Mg,
(c) subjecting said thickened sludge product (b1) to an anaerobic digestion stage in an anaerobic digester for i) producing a biogas stream and a digested sludge product, and retrieving said biogas and ii) for conversion of organically bound P into soluble P by biological degradation of organic material, thereby increasing the possible overall recovery rate of P,
(d) separating in a first-dewatering stage said digested sludge product into a first digested sludge product (d1) containing solid particles, and a liquid concentrate (d2) rich in $PO_4$—P and $NH_4$—N,
(e) transferring said liquid concentrate (b2) rich in P and Mg from step (b) and said liquid concentrate (d2) rich in $PO_4$—P and $NH_4$—N from step (d) into a phosphate recovery process for producing a phosphate salt, (f) subjecting said first digested sludge product (d1) from step (d) to a thermal hydrolysis stage in a thermal hydrolysis unit for converting the solid particles of said first digested sludge product (d1) at least partially into soluble organic material, thereby forming a digested and thermally hydrolized sludge product (f1), and for converting some of the organic bound P and chemical bound P into soluble P, thereby increasing the possible overall recovery rate of P (hydrolysed sludge typically has a low pH, such as 3 to 6.5, typically 5 to 6, which can contribute to solubilisation of some of the chemically precipitated P, such as $FePO_4$, $AlPO_4$, $CaPO_4$, $MgPO_4$, apatite minerals and similar minerals).

(g) separating in a second dewatering stage said digested and thermally hydrolysed sludge product (f1) into a second digested and hydrolysed sludge product (g1), and a, preferably hot, liquid concentrate stream (g2) rich in volatile fatty acids (VFA) and containing the additionally released P, and optionally colloidal organic material, (h) recycling at least a portion of said liquid concentrate (g2) resulting from step (g) to step (a), e.g. to the contact tank of step (a).

Thus, in a method or process according to the present invention the release of P occurs via a combination of several stages: in an upstream biological P removal process, in the contact tank, in the anaerobic digester and finally in the thermal hydrolysis unit where P released is recycled as soluble P as part of said liquid concentrate stream (g2) into the contact tank. This enables, contrary to the prior art, recovering of 50% or more of the P present in the biomass material.

In an embodiment of the first aspect of the invention, said biomass material is wet activated sludge (WAS) produced from an EBPR-process, hereinafter also referred as EBPR-sludge. Preferably, the WAS contains 0.5-3.0% DS (dry solids), more preferably 0.8-2.0% DS.

Said EBPR-process is preferably an upstream wastewater treatment process and comprises: optionally subjecting the influent i.e. wastewater, through a primary treatment for the capture of suspended solids and organic material, optionally in a primary clarifier thereby producing a primary sludge, then passing the influent through an anaerobic stage in an anaerobic unit, subsequently through an anoxic stage in an anoxic unit, then through an aerobic stage in an aerobic unit such as an aeration tank, and finally through a secondary treatment for the capture of suspended solids preferably in a secondary clarifier, thereby separating the cleaned effluent from an activated sludge. Part of this activated sludge is returned to the anaerobic stage, and the remaining portion is retrieved as said waste activated sludge (WAS).

According to the present invention, in order for the biomass material, i.e. EBPR-sludge, to release its stored P, it needs to be put in anaerobic conditions in the presence of organic material (expressed as COD or BOD), more specifically volatile fatty acids (VFA), and optionally also colloidal organic material. This is achieved in a contact tank, fed with EBPR-sludge, preferably settled or thickened EBPR-sludge, and VFA's provided from the liquid concentrate stream from the second dewatering step. As explained above, the liquid concentrate from the second dewatering step also provides additional P released by the prior thermal hydrolysis stage.

In order for the process to take place as quickly as possible and at as high efficiency as possible, heat may be added, e.g. through the addition of the preferably hot concentrate (g2). Performing the P-release process at higher temperature will give rise to at least the following two effects:

Possibility to reduce the size of the release reactors
Improved release of phosphorous into soluble form In another embodiment according to the first aspect, the method further comprises recycling at least a portion of said liquid concentrate stream (g2) resulting from said second dewatering stage of step (g) to the anaerobic digestion stage of step (c). This results in a higher degree of conversion of organic material into biogas. The anaerobic digester has a residence time of 10-40 days, such as 15-30 days, preferably 20 days. While all liquid concentrate could go to the contact tank, it is better to send only that amount providing the amount of VFA needed for P-release in the contact tank and send the remainder to the digester for biogas production. This enables controlling the portion of the concentrate going to the contact tank, and only add what is needed for the bio-P release. Hence, the amount of VFA supplied, and more specifically the ratio of VFA to biomass material (EBPR-sludge), can be controlled by controlling the flow of liquid concentrate stream resulting from the second dewatering stage to the contact tank with the remaining portion of this liquid concentrate stream being directed to the anaerobic digester. This, again, allows for a controlled biological release of P from the EBPR sludge. Simultaneous with the P-release also Mg is released from the EBPR-sludge.

The added VFA is absorbed by the EBPR-sludge and converted into PHA. This material will to a large extent be broken down during anaerobic digestion and converted into biogas. Hence, it has been found that the addition of VFA to the contact tank and optionally also to the anaerobic digester does not necessarily represent a loss in biogas production—when compared to sending all liquid concentrate from the second dewatering stage to the anaerobic digester.

In another embodiment of the first aspect, step (g) further comprises:

separating at least a portion of said liquid concentrate (g2) into a cake product and a liquid concentrate stream with reduced content of solids,
and
recycling said cake product to the anaerobic digestion stage of step (c).

In such an embodiment not all P in the concentrate from second dewatering step will be recycled to the release tank. However, any such additional soluble P will end up in the concentrate from first dewatering step, which is sent to the struvite reactor so overall P recovery will stay the same.

This liquid concentrate stream with reduced content of solids, i.e. with no colloidal organic material, is recycled to the contact tank of step (a). Actually, it has been found that no colloidal material is needed and therefore this embodiment enables that no colloidal material be added to the contact tank of step (a). Any soluble P will not be removed by the removal of colloidal material, so any such soluble P will still end up in the contact tank.

The liquid concentrate stream (g2) resulting from the second dewatering stage in step (g) contains high amounts of soluble COD in the form of VFA and other organic compounds, as well as colloidal organic material which is relatively easily biodegradable. As explained above, the liquid concentrate stream (g2) will also contain additional P. This liquid concentrate stream can be recycled directly to the contact tank and to the anaerobic digester, the ratio depending on the need for VFA of the contact tank, or according to the above particular embodiment this stream can be further separated into a cake product which is sent to the anaerobic digester and a liquid concentrate stream with reduced content of solids, i.e. a solid-free liquid, with mostly soluble organic material that can be used very efficiently for the P-release in the contact tank. The separation of the liquid concentrate stream into a cake and a liquid concentrated with reduced content of solids is preferably conducted by means of a disc centrifuge. Other similar equipment may be used.

In another embodiment of the first aspect, the method further comprises using at least part of said liquid concentrate (g2) from said second dewatering stage, or at least part of said liquid concentrated stream with reduced content of solids in assisting the biological P and/or biological N removal in an upstream wastewater treatment process including an anaerobic stage, for producing said biomass material. This enables reducing or eliminating the need for acquiring expensive external carbon sources for said anaerobic stage. Preferably, said upstream wastewater treatment process is an EBPR-process.

In another embodiment of the first aspect, the method further comprises providing a residence time in the contact tank of the contacting step (a) of 1-3 hours. The liquid concentrate stream (g2) resulting from said second dewatering stage of step (g) has a temperature in the range 70-100° C., Thus, this stream also provides heat to the contact tank and by raising the average temperature of the sludge the release of P is enhanced. With sufficient VFA and heat available, a short residence time is sufficient for the P release in the contact tank. Preferably, the residence time (HRT) is in the range 0.5 h to >1 day, for instance up to 2 days. More preferably, the residence time is 1-3 hours, most preferably 1.2-2.0 hours, e.g. 1.5 hours. It has been found that this narrow range of residence time gives best results, as it allows in this stage the release of as much as 25-35% of the P stored in the biomass material (EBPR-sludge).

In another embodiment of the first aspect, the method further comprises adding to the contact tank of step (a): an overflow from the thickener unit of step (b), and/or primary sludge. Preferably this primary sludge is from an upstream wastewater treatment plant or process and contains 2-5% DS. The overflow from the thickener unit is rich in VFA, while the primary sludge enables simultaneous further thickening, although the process does not rely on these additional streams. By adding primary sludge to the contact tank of step (a), hydrolysis of this sludge produces VFA for the release of P.

In the separating step (b), gravitational or mechanical thickening of the biomass material after biological P release is conducted. The mixed sludge from the contact tank is separated into a concentrated thickened sludge product stream and a liquid concentrate stream rich in P and Mg. The gravitational or mechanical thickening is preferably conducted in a belt thickener, drum thickener, screw press, or centrifuge, or similar. The concentrated thickened sludge is then led to the anaerobic digestion stage, while the reject from the thickening, i.e. the liquid concentrate stream rich in P and Mg, is sent to the phosphate recovery process for producing a phosphate salt.

The anaerobic digestion stage in step (c) is a biological process converting the organic material into biogas, i.e. a mixture of $CH_4$ and $CO_2$ and some trace gases. As a result of the conversion of the organic material, other cell constituents like P (as $PO_4$—P), nitrogen N (as $NH_4$—N) and minerals (e.g. Mg) are released and solubilized. Normally, EBPR-sludge digestion often suffers from struvite formation during digestion as all key components ($PO_4$—P, $NRH_4$—N and Mg) are present, however according to the present invention, struvite formation is reduced or eliminated since a substantial amount of Mg and $PO_4$—P is removed prior to the digestion in the contact tank and the thickening process. This allows for the majority of the released $PO_4$—P to stay in the soluble form and then be directed to the phosphate recovery process after the first dewatering stage of step (d), i.e. pre-dewatering stage.

The performance of the anaerobic digester in the anaerobic digestion stage in terms of conversion of organic material is in the range of 40 to 60%, such as around 50%. By adding the thermal hydrolysis stage of step (f) more organic material can be converted (50-80%) and more phosphorous will become available for recovery in the phosphate recovery process.

The anaerobic digestion stage produces a biogas stream that is a renewable fuel that can be used for producing heat and electricity in gas engines, turbines or fuel cells, or upgraded to natural gas or vehicle fuel.

After anaerobic digestion, the digested sludge product, i.e. non-biogas product, is separated from the liquid phase in the first dewatering stage of step (d), i.e. pre-dewatering. This first dewatering is preferably conducted in a decanter, centrifuge, filter press, screw press. Other traditional dewatering equipment may be used. The first dewatering produces a first digested sludge product, i.e. a first cake product, containing solid particles. Preferably the content of solid particles is 10-25% DS such as 10-20% DS, more preferably 16%-17% DS. The first digested sludge product is then fed to the thermal hydrolysis stage of step (f) while a liquid concentrate rich in $PO_4$—P and $NH_4$—N is sent to the phosphate recovery process.

The thermal hydrolysis stage of step (f) includes heating the first digested sludge product formed in the first dewatering stage at elevated temperatures of 130-200° C., often 150-170° C. such as 160° C., and pressures of 2 to 20 bar pressure, often 4-8 bar, such as 6 bar, which will hydrolyse part of the organic material into soluble and colloidal material. The thermal hydrolysis also changes the physical nature of the first digested sludge product by reducing its viscosity and improving its "dewaterability". In addition, the thermal hydrolysis system converts non-biodegradable material into soluble and more easily biodegradable material. During thermal hydrolysis also some of the remaining phosphate, i.e. some of the remaining particulate phosphorous, is solubilized or is at least converted into colloidal material that ends up in the liquid concentrate stream which is recirculated to the contact tank in the contacting step (a) and/or the anaerobic digester in the anaerobic digestion stage (c).

The treated sludge after thermal hydrolysis is sent to the second and preferably final dewatering stage of step (g), i.e. post-dewatering, thereby producing a second digested and hydrolysed sludge product, i.e. second cake product, with a relative high dry solids cake, namely 20-60% DS, often 25-50% DS, such as 35-45% DS. This second dewatering is preferably conducted in a decanter, centrifuge, filter press, screw press. Other traditional dewatering equipment may be utilized, such as belt filters, etc. In a particular embodiment, a polymer is added to the second dewatering stage to control the quality of the liquid concentrate stream.

As explained above, the liquid concentrate stream resulting from the final dewatering of step (g) both comprises some of the otherwise organic bound P and/or chemically bound P in the form of soluble P (hydrolysed sludge typically has a low pH, such as 3 to 6.5, typically 5 to 6, which can contribute to solubilisation of some of the chemically precipitated P, such as $FePO_4$, $AlPO_4$, $CaPO_4$, $MgPO_4$, apatite minerals and similar minerals) and has a high temperature, i.e. in the range 70-100° C.

Thus, returning all or part of this stream to the anaerobic digestion stage reduces the energy need for this anaerobic digestion. Taking into account also the substantial increase in biogas production, the overall energy balance is significantly improved.

Furthermore, the recycling of the hot liquid concentrate stream from the final dewatering of step (g) to the contact tank in the contacting step (a) not only increases the amount of soluble P thereby available but also increases the temperature in this tank thereby improving the efficiency of P release, as already mentioned above. Furthermore, since part of that treated flow (after thickening) is fed as a concentrated thickened sludge to the anaerobic digestion stage, this also represents a further reduction of the heat requirement of the anaerobic digester. The heat in the liquid concentrate stream from the sludge thickener unit of step (b) is preferably recovered by heat exchange with the wet activated sludge (WAS) produced from an EBPR-process, i.e. the biomass material fed to the contact tank. The heat may also be recovered by heat exchange with another flow in the process.

In another embodiment of the first aspect, said phosphate recovery process for producing a phosphate salt in step (e) comprises at least the following process steps:
subjecting said liquid concentrates to a crystallization process in a struvite formation reactor
isolating any struvite crystals formed in said struvite formation reactor by sedimentation or cyclone technology.

In this phosphate recovery process, all phosphate rich streams are collected and treated to recover the valuable phosphorous. Two main streams are collected:
liquid concentrate from the separating step (b), i.e. from the thickener unit, which is rich in P ($PO_4$—P) and Mg,
liquid concentrate from the first dewatering stage in step (d), rich in $PO_4$—P and $NH_4$—N.
in addition, some internal streams from thickener unit or other can be added if they are rich in one of the key constituents ($PO_4$—P, $NH_4$—N, Mg).

Even if each stream separately does not contain the right chemical for struvite formation, a method or process according to the present invention circumvents the need for the addition of extraneous chemicals for struvite formation. Thus, the liquid concentrate from the thickener unit in step (b) lacks ammonia ($NH_4$—N), and the liquid concentrate from the first dewatering stage in step (d) lacks Mg. Combined, however, both streams contain the right chemicals for struvite formation. During struvite formation most of the $PO_4$—P is removed. Ammonia is only partly removed, however the removal of ammonia at least partially compensates for the extra ammonia release during digestion as a result of the improved overall organics conversion.

Ina particular embodiment, said phosphate recovery process further comprises a degassing step for removing $CO_2$ from the liquid concentrates, i.e. liquid phases, thereby increasing the pH. This enhances the production of struvite.

In another particular embodiment, said phosphate recovery process further comprises the steps of:
adding additional Mg to said struvite formation reactor, and/or
adding a base or an acid to said struvite formation reactor. This enhances the crystallization of said struvite.

Accordingly, the mixed liquid concentrate streams are further treated using the following process steps:
degassing: degassing removes $CO_2$ from the water and increases the pH,
struvite formation reactor: a crystallization reactor allows for enough contact between the chemicals and time for the crystals to grow. As there is always one chemical, with the presence of Mg being limiting for maximum struvite formation, this chemical is added. Also if needed some pH control can be executed,
the struvite formed is separated from the liquid using sedimentation or cyclone technology or similar. The treated liquid concentrate streams, after struvite formation, are returned to the upstream wastewater treatment plant for polishing.

Alternatively, the phosphate can also be recovered in other chemical forms, depending on the market requirement for P fertilizer. Alternative P products are thus $MgPO_4$, $CaPO_4$ or similar. Accordingly, a possible solution is precipitating calcium phosphate by adding a calcium source in front of a precipitation unit.

In a second aspect of the invention, there is also provided a plant for recovering phosphate from a biomass material, preferably waste activated sludge (WAS), the plant comprising:
a contact tank for receiving said biomass material and a recycle stream from a second dewatering unit, i.e. downstream second dewatering unit, thereby producing a mixed sludge,
a thickener unit for thickening said mixed sludge and thereby producing a concentrated thickened sludge product and a liquid concentrate stream rich in P ($PO_4$) and Mg,
an anaerobic digester for digesting said concentrated thickened sludge product, thereby producing a biogas stream and a digested sludge product,
a first dewatering unit for dewatering said digested sludge product, thereby producing a first digested sludge product and a liquid concentrate stream rich in $PO_4$—P and $NH_4$—N,
a struvite reactor for receiving said liquid concentrate rich in P and Mg, and said liquid concentrate rich in $PO_4$—P and $NH_4$—N, thereby producing struvite,
a thermal hydrolysis unit for hydrolysing said first digested sludge product, thereby producing a digested and thermally hydrolysed sludge product,
a second dewatering unit for dewatering said digested and thermally hydrolysed sludge product, thereby producing a second digested and hydrolysed sludge product and a liquid concentrate stream rich in volatile fatty acids (VFA), solubilised P and optionally colloidal organic, material, and
a conduit for leading at least a portion of said liquid concentrate rich in volatile fatty acids (VFA), solubilised P and optionally colloidal organic material, to said contact tank for contacting with said biomass material.

In an embodiment of the second aspect of the invention, the plant further comprises a conduit for leading at least a portion of said liquid concentrate rich in volatile fatty acids (VFA), solubilised P and colloidal organic material, to said anaerobic digester.

In another embodiment of the second aspect, the plant further comprises:
a separating unit, preferably a disc centrifuge, for separating said liquid concentrate stream rich in volatile fatty acids (VFA), solubilised P and colloidal organic material into a cake product and a liquid concentrate stream with reduced content of solids but containing the solubilised P,
a conduit or transporting means for leading said cake product to said anaerobic digester.

In another embodiment of the second aspect, said biomass material is waste activated sludge (WAS) produced in an upstream wastewater treatment plant (WWTP), said wastewater treatment plant comprising an anaerobic unit (i.e. reactor or zone), anoxic unit and aerobic unit followed by a clarifier for producing an activated sludge, an internal recycle means e.g. internal recycle conduit for recycling a mixed liquor from the aerobic unit to the anoxic unit, recycle means for returning a portion of said activated sludge as return activated sludge (RAS) to the anaerobic unit, and means for withdrawing a portion of said activated sludge as said waste activate sludge (WAS).

Preferably, the anaerobic unit, anoxic unit, aerobic unit and clarifier are arranged in series, as is typical in an Enhanced Biological Phosphorous Removal plant (EBPR plant). Thus, suitably, said upstream WWTP comprises an Enhanced Biological Phosphorous Removal plant.

In another embodiment of the second aspect, said upstream WWTP further comprises upstream said anaerobic unit, a primary clarifier for receiving a wastewater influent, thereby capturing suspended solids and organic material and thereby forming a primary sludge. The primary sludge is thereby produced prior to the biological treatment of the EPBR process.

Thus, there is an uptake of P from the wastewater and a sludge with an accumulation of P inside the cell mass. The resulting biomass material, here WAS, will contain 0.8%-2% DS and a P content of about 5% on the DS, more specifically 2 to 6%, often about 4-5%. The invention enables extracting as much as possible P from the WAS and also maximizes energy production.

Any of the embodiments of the first aspect of the invention may be combined with any of the embodiments of the second aspect.

In a third aspect of the invention, there is also provided a method for retrofitting an existing wastewater treatment plant, said wastewater treatment plant comprising biological P removal, preferably EPRP, said method of retrofitting comprising:
  installing a contact tank which is adapted for receiving: a biomass material inlet conduit, said biomass material being produced in said waste water treatment plant, and a recycle stream conduit from a second dewatering unit located downstream, said recycle stream conduit carrying a liquid concentrate stream rich in VFA's and solubilised P and optionally colloidal organic material,
  installing a thickener unit for thickening a mixed sludge produced in said contact tank,
  installing an anaerobic digester for digesting a concentrated thickened sludge product produced in said thickener unit,
  installing a first dewatering unit for dewatering a digested sludge product produced in said anaerobic digester,
  installing a first conduit for transporting a liquid concentrate rich in P and Mg from said thickener unit,
  installing a second conduit for transporting a liquid concentrate rich in P and $NH_4$—N from said first dewatering unit,
  installing a struvite reactor for producing struvite, said reactor being adapted to receive as inlet any of said first and second conduit containing said liquid concentrate rich in P or rich in $NH_4$—N,
  installing a thermal hydrolysis unit for hydrolysing a first sludge product produced in said first dewatering unit,
  installing said second dewatering unit for dewatering digested and thermally hydrolysed sludge product produced in said thermal hydrolysis unit,
  installing a recycle stream conduit for recycling said liquid concentrate stream rich in VFA's and solubilised P and optionally colloidal organic material to said contact tank.

Any of the embodiments of the first aspect and second aspect of the invention may be used in connection with the invention according to the third aspect.

The invention offers some clear advantages with respect to the prior art:
  the contact process removes a part of the phosphate with very little effort. Also it removes Mg from the sludge which reduces the risk of struvite formation in the digester,
  the VFA's required for the P-release are provided by the concentrate (stream) from the final dewatering after thermal hydrolysis. The VFA's are not lost but converted into PHA which is further converted into biogas during digestion,
  the process can run with or without addition of primary sludge so does not rely on fermentation of primary sludge like some other processes,
  the process recycles heat which improves the efficiency of the contact tank and allows for shorter HRT
  the process releases P as a result of anaerobic biological activity of EBPR sludge in the (anaerobic) contact tank, as well as P-release due to anaerobic digestion and additional P release as a result of the thermal hydrolysis process,
  overall the processes maximize the solubilization of phosphate and increases the amount of P that can be recovered, by recovering 50% or more of the P that is present in the raw sludge (WAS),
  the process produces two separate concentrates which both individually lack the capability of struvite formation. However combined they have all constituents for struvite formation
  the process results in a very efficient energy balance. The heat supplied in the Thermal Hydrolysis stage is (partially) re-used by returning part of the hot concentrate back to the digesters. This reduces the extra energy need of the digester, and furthermore, by returning the organic material the production of biogas is increased
  the process strongly improves the dewaterability of the sludge and reduces the amount of cake that needs to be disposed of; this reduces the disposal cost and increases the calorific value of the cake (on a wet basis)
  the process uses to a maximum amount all compounds present in the sludge (such as organic material, nitrogen, phosphorous, magnesium) and converts it into valuable products
  overall the process is relatively simple and straightforward and easily to integrate in existing wastewater treatment plants. The concept applies add-on elements to existing plant infrastructure. Prior art technologies are usually much more complex and need separate or multiple digestion stages, multiple struvite reactors etc.

EXAMPLE

Figure 1:
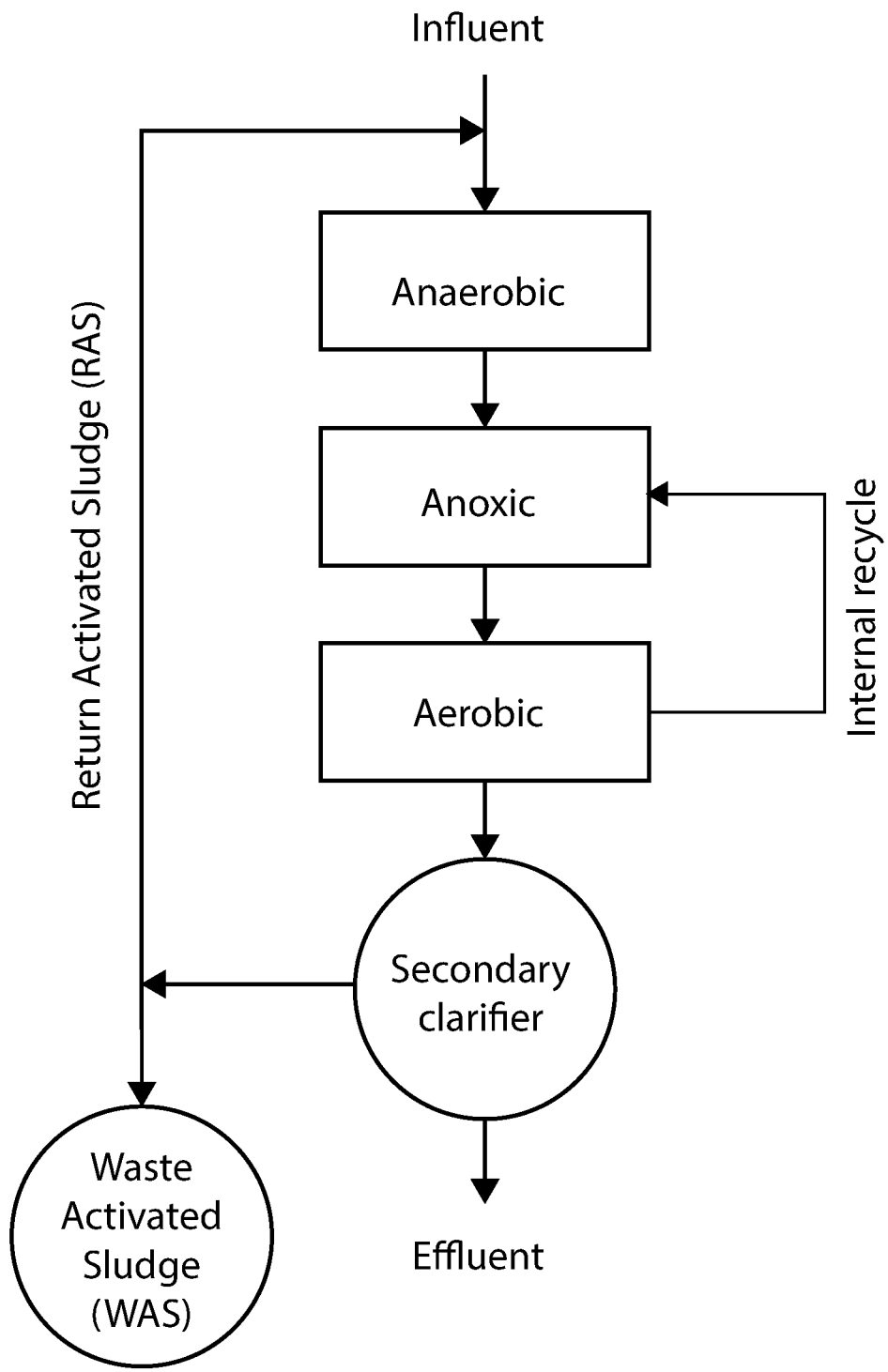
FIG. 1 shows a typical EBPR-process.
Figure 2:
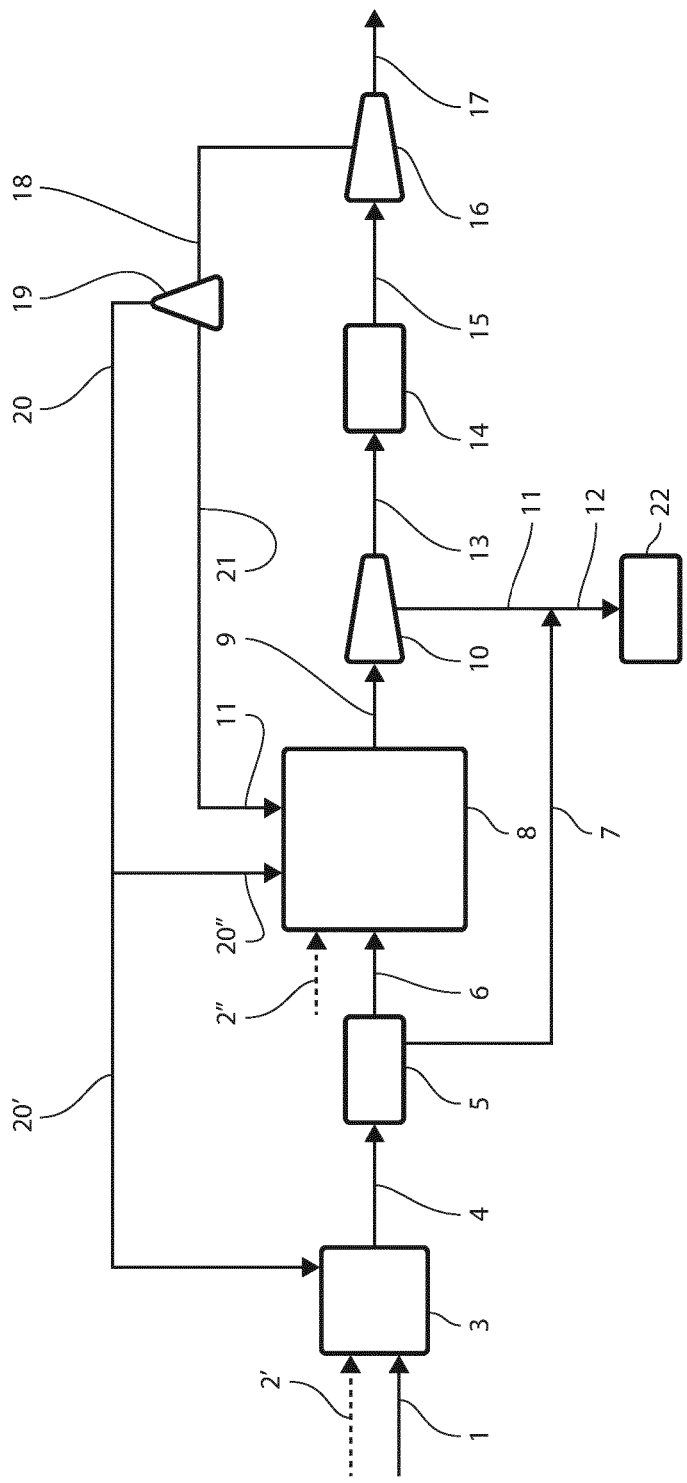
FIG. 2 shows a process scheme of a plant according to a particular embodiment of the present invention.

A process according to the scheme provided in FIG. 2 is run. A waste activated sludge (WAS) stream 1 produced in an upstream WWTP (not shown) and containing 0.8-2% DS enters the contact tank 3 having a residence time of 1-3 hrs for release of its stored P. For this, a recycle stream 20' of liquid concentrate stream 20 containing soluble COD as volatile fatty acids (VFA) and soluble P is also added to the contact tank 3. Optionally, a primary sludge stream 2' from e.g. the upstream WWTP, and often having 2-5% DS, is also added to the contact tank 3. Together with the P-release, also Mg is released from the WAS.

A mixed sludge 4 is formed which is fed to a thickener unit 5, such as belt thickener, thereby forming a concentrated thickened sludge 6 with reduced P and Mg level, and about 5% DS, and a liquid concentrate stream 7 rich in $PO_4$ and Mg. The concentrated thickened sludge 6 is subjected to anaerobic digestion in anaerobic digester 8, having a residence time of 15-30 days, preferably 20 days. Another portion 20" of the liquid concentrate stream 20 containing volatile fatty acids (VFA) is also added to the anaerobic digester 8. Optionally, primary sludge 2" is also fed to the digester 8. This results in the production of a digested sludge product 9 and biogas (not shown).

The digested sludge product 9 is separated in a first dewatering unit 10 into a liquid concentrate stream 11 rich in $PO_4$—P and $NH_4$—N and a first digested sludge product (first cake product) 13 having 15-17% DS. The liquid concentrate stream 7 rich in $PO_4$ and Mg and the liquid concentrate stream 11 rich in $PO_4$—P and $NH_4$—N are combined as common stream 12 or independently fed to a phosphate recovery process unit 22, suitably including a struvite formation reactor, for the formation of struvite as a valuable product.

The first digested sludge product 13 is led to a thermal hydrolysis unit 14 and creates a digested and thermally hydrolysed sludge product 15 which is then fed to a second dewatering unit 16. This dewatering unit (post-dewatering), for instance a decanter, produces a second digested and thermally hydrolysed sludge product 17 having 35-40% DS, which is ready for incineration, further drying or other form of disposal, and a liquid concentrate stream 18 rich in soluble COD, e.g. VFA's, as well as colloidal organic material.

A separating unit, preferably a disc centrifuge 19 is provided to separate at least a portion of said liquid concentrate 18 into a cake product 21 which is recycled to the anaerobic digester 8, and a liquid concentrate stream 20 with reduced content of solids.

The invention claimed is:

1. Method for recovering phosphate from a biomass material, said method comprising the steps of:
    (a) contacting in a contact tank said biomass material together with a liquid concentrate stream rich in volatile fatty acids and solubilised P with reduced content of solids resulting from step (g), for producing a mixed sludge,
    (b) separating in a thickener unit the mixed sludge of step (a) into: a concentrated thickened sludge product (b1) with reduced P and Mg levels, and a liquid concentrate stream (b2) rich in P and Mg,
    (c) subjecting said concentrated thickened sludge product (b1) to an anaerobic digestion stage in an anaerobic digester for producing a biogas stream and a digested sludge product, and retrieving said biogas,
    (d) separating in a first-dewatering stage said digested sludge product into a first digested sludge product (d1) containing solid particles, and a liquid concentrate (d2) rich in $PO_4$—P and $NH_4$—N,
    (e) transferring said liquid concentrate (b2) rich in P and Mg from step (b) and said liquid concentrate (d2) rich in $PO_4$—P and $NH_4$—N from step (d) into a phosphate recovery process for producing a phosphate salt,
    (f) subjecting said first digested sludge product (d1) from step (d) to a thermal hydrolysis stage in a thermal hydrolysis unit for converting the solid particles of said first digested sludge product (d1) at least partially into soluble organic material, thereby forming a thermally hydrolysed sludge product (f1),
    (g) separating in a second dewatering stage said digested and thermally hydrolysed sludge product (f1) into a second digested and thermally hydrolysed sludge product (g1), and the liquid concentrate stream (g2) rich in volatile fatty acids and solubilised P; separating at least a portion of said liquid concentrate stream (g2) into a cake product and a liquid concentrate stream with reduced content of solids; and recycling said cake product to the anaerobic digestion stage of step (c), and
    (h) recycling said liquid concentrate stream rich in volatile fatty acids and solubilised P with reduced content of solids resulting from step (g) to step (a).

2. The method according to claim 1, wherein said biomass material is wet activated sludge (WAS) produced from an enhanced biological phosphorous removal process, and the WAS contains 0.5-3.0% DS (dry solids).

3. The method according to claim 1, further comprising recycling a portion of said liquid concentrate stream (g2) resulting from said second dewatering stage of step (g) to the anaerobic digestion stage of step (c).

4. The method according to claim 1, further comprising using at least part of said liquid concentrate stream (g2) from said second dewatering stage, or at least part of said liquid concentrated stream with reduced content of solids in assisting the biological P and/or biological N removal in a upstream wastewater treatment process including an anaerobic stage, for producing said biomass material.

5. The method according to claim 1, further comprising providing a residence time in the contact tank of the contacting step (a) of 1-3 hours.

6. The method according to claim 1, further comprising adding to the contact tank of step (a) an overflow from the thickener unit of step (b), and/or primary sludge.

7. The method according to claim 1, wherein said phosphate recovery process for producing a phosphate salt in step (e) comprises at least the following process steps:
    subjecting said liquid concentrates to a crystallization process in a struvite formation reactor, and
    isolating any struvite crystals formed in said struvite formation reactor by sedimentation or cyclone technology.

8. The method according to claim 7, further comprising a degassing step for removing $CO_2$ from one or more of the liquid concentrates streams (b2), (d2) and (g2) thereby increasing the pH.

9. The method according to claim 7, further comprising the steps of:
    adding additional Mg to said struvite formation reactor and/or
    adding a base or an acid to said struvite formation reactor, for enhancing the crystallization of said struvite.

10. Plant for recovering phosphate from a biomass material, the plant comprising:
    a contact tank for receiving said biomass material and a recycle stream from a second dewatering unit, thereby producing a mixed sludge, a thickener unit for thickening said mixed sludge and thereby producing a concentrated thickened sludge product and a liquid concentrate stream rich in P ($PO_4$) and Mg, an anaerobic digester for digesting said concentrated thickened sludge product, thereby producing a biogas stream and a digested sludge product, a first dewatering unit for dewatering said digested sludge product, thereby producing a first digested sludge product and a liquid concentrate stream rich in $PO_4$—P and $NH_4$—N, a struvite formation reactor for receiving said liquid concentrate rich in P and Mg, and said liquid concentrate rich in $PO_4$—P and $NH_4$—N, thereby producing struvite, a thermal hydrolysis unit for hydrolysing said first digested sludge product, thereby producing a digested and thermally hydrolysed sludge product, a second dewatering unit for dewatering said digested and thermally hydrolysed sludge product, thereby producing a second digested and thermally hydrolysed sludge product and a liquid concentrate stream rich in volatile fatty acids, solubilised P and optionally colloidal organic material, a conduit for leading at least a portion of said liquid concentrate rich in volatile fatty acids, solubilised P and optionally colloidal organic material, to said contact tank for contacting with said biomass material, a separating unit, for separating said liquid concentrate stream rich in volatile fatty acids (VFA), solubilized P as well as colloidal organic material into a cake product and a liquid concentrate stream with reduced content of solids, and a conduit or transporting means for leading said cake product to said anaerobic digester.

11. Plant according to claim 10 further comprising a conduit for leading at least a portion of said liquid concentrate rich in said volatile fatty acids, said solubilised P and said colloidal organic material, to said anaerobic digester.

12. A method of retrofitting an existing wastewater treatment plant comprising biological P removal, said wastewater treatment plant comprising an anaerobic unit, anoxic unit and aerobic unit and a clarifier arranged in series for producing an activated sludge, an internal recycle means for recycling a mixed liquor from the aerobic unit to the anoxic unit, recycle means for returning a portion of said activated sludge as return activated sludge to the anaerobic unit, and means for withdrawing a portion of said activated sludge as said waste activate sludge said method of retrofitting comprising:

installing a contact tank which is adapted for receiving: a biomass material inlet conduit, said biomass material being produced in said waste water treatment plant, and a recycle stream conduit from a second dewatering unit located downstream, said recycle stream conduit carrying a liquid concentrate stream rich in volatile fatty acids (VFAs) and solubilised P and optionally colloidal organic material, installing a thickener unit for thickening a mixed sludge produced in said contact tank, installing an anaerobic digester for digesting a concentrated thickened sludge product produced in said thickener unit, installing a first dewatering unit for dewatering a digested sludge product produced in said anaerobic digester, installing a first conduit for transporting a liquid concentrate rich in P and Mg from said thickener unit, installing a second conduit for transporting a liquid concentrate rich in P and $NH_4$—N from said first dewatering unit, installing a struvite reactor for producing struvite, said reactor being adapted to receive as inlet said first and second conduit containing said liquid concentrate rich in P and rich in $NH_4$—N, installing a thermal hydrolysis unit for hydrolysing a first sludge product produced in said first dewatering unit, installing said second dewatering unit for dewatering digested and thermally hydrolysed sludge product produced in said thermal hydrolysis unit, installing the recycle stream conduit for recycling said liquid concentrate stream rich in volatile fatty acids and solubilised P and optionally colloidal organic material to said contact tank, installing a separating unit, for separating said liquid concentrate stream rich in VFAs, solubilised P and optionally colloidal organic material into a cake product and a liquid concentrate stream with reduced content of solids, and installing a conduit or transporting means for leading said cake product to said anaerobic digester.

13. Method of retrofitting an existing wastewater treatment plant according to claim 12, wherein said existing wastewater treatment plant further comprises upstream said anaerobic unit, a primary clarifier for receiving a wastewater influent, thereby capturing suspended solids and organic material, and thereby forming a primary sludge.

* * * * *